US011401422B2

(12) United States Patent
Phukan et al.

(10) Patent No.: US 11,401,422 B2
(45) Date of Patent: Aug. 2, 2022

(54) LIQUID SILICONE RUBBER COMPOSITION

(71) Applicants: DOW SILICONES CORPORATION, Midland, MI (US); DOW GLOBAL TECHNOLOGIES LLC, Midland, MI (US)

(72) Inventors: Humen Phukan, Mumbai (IN); Parag Sawant, Mumbai (IN); Tushar Shinde, Mumbai (IN); Padmadas Nair, Mumbai (IN); Shamit Pillay, Mumbai (IN)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 410 days.

(21) Appl. No.: 16/629,939

(22) PCT Filed: Jul. 12, 2018

(86) PCT No.: PCT/US2018/041725
§ 371 (c)(1),
(2) Date: Jan. 9, 2020

(87) PCT Pub. No.: WO2019/014403
PCT Pub. Date: Jan. 17, 2019

(65) Prior Publication Data
US 2020/0325336 A1  Oct. 15, 2020

(30) Foreign Application Priority Data
Jul. 12, 2017  (IN) .............................. 201741024634

(51) Int. Cl.
| C08F 2/46 | (2006.01) |
| C08F 2/50 | (2006.01) |
| C08G 61/04 | (2006.01) |
| C08L 83/04 | (2006.01) |
| C09D 11/033 | (2014.01) |
| C09D 11/102 | (2014.01) |
| D06M 15/643 | (2006.01) |
| C08K 3/36 | (2006.01) |

(52) U.S. Cl.
CPC ............ *C08L 83/04* (2013.01); *C09D 11/033* (2013.01); *C09D 11/102* (2013.01); *D06M 15/643* (2013.01); *C08K 3/36* (2013.01); *D06N 2201/042* (2013.01); *D06N 2201/06* (2013.01)

(58) Field of Classification Search
CPC .. D06M 11/79; D06M 3/0006; D06M 15/693; D06M 15/643; D06M 2101/38; D06M 2200/50; D06M 2201/06; D06M 2201/32; D06M 2400/02; C09D 183/04; C09D 11/102; C09D 11/033; D06P 1/44; D06P 1/5292; D06P 1/67383; C08L 83/04; C08L 83/00; D06N 3/0025; D06N 3/106; D06N 3/128; D06N 3/0006; D06N 3/0063; D06N 2201/06; D06N 2201/042; D06N 2211/268; D06N 2209/0846; D06N 2209/0838; C08G 77/20; C08G 77/12; C08K 3/36
USPC ......................................... 522/172, 1; 520/1
See application file for complete search history.

(56) References Cited

U.S. PATENT DOCUMENTS

| 5,595,695 A | 1/1997 | Hagen |
| 7,897,526 B1 | 3/2011 | Eberts et al. |
| 2004/0121156 A1 | 6/2004 | Meyer et al. |
| 2007/0141250 A1 | 6/2007 | Mei |
| 2010/0055334 A1 | 3/2010 | Kim |
| 2013/0225024 A1 | 8/2013 | Mizushima et al. |
| 2013/0337026 A1 | 12/2013 | Cassin et al. |
| 2015/0320648 A1 | 11/2015 | Pierre et al. |

FOREIGN PATENT DOCUMENTS

| CN | 1729245 A | 2/2006 | |
| CN | 101278089 A | 10/2008 | |
| CN | 101432366 A | 5/2009 | |
| CN | 103327955 A | 9/2013 | |
| CN | 103415660 A | 11/2013 | |
| EP | 2053160 A1 * | 4/2009 | .............. C08L 83/00 |
| EP | 2053160 A1 | 4/2009 | |
| FR | 1269856 A | 8/1961 | |
| WO | 2012084780 A2 | 6/2012 | |

OTHER PUBLICATIONS

International Search Report for PCT/US2018/041725 dated Oct. 16, 2018, 3 pages.
Machine assisted English translation of FR1269856A obtained from https://worldwide.espacenet.com on Jan. 9, 2020, 22 pages.
Machine assisted English translation of FR1269856A obtained from https://worldwide.espacenet.com/patent on May 20, 2022, 17 pages.
First search report for CN Appl. No. 201880053082, 2 pages.

* cited by examiner

*Primary Examiner* — Jessica Whiteley
(74) *Attorney, Agent, or Firm* — Warner Norcross + Judd LLP

(57) ABSTRACT

A liquid silicone rubber (LSR) composition, and articles and coatings made therewith are disclosed. Also disclosed is a process to provide for the composition, and a process to coat on textile.

17 Claims, No Drawings

LIQUID SILICONE RUBBER COMPOSITION

CROSS-REFERENCE TO RELATED APPLICATIONS

This application is the National Stage of International Appl. No. PCT/US2018/041725 filed on Jul. 12, 2018 which claims priority to and all advantages of the India Application No. 201741024634 filed on Jul. 12, 2017, the content of which is hereby incorporated by reference.

FIELD OF THE INVENTION

The present invention relates to a liquid silicone rubber (LSR) composition, and articles and coated articles made therewith. Also disclosed is a process to provide for the composition, and a process to coat or print on a substrate.

BACKGROUND OF THE INVENTION

Liquid silicone rubber ("LSR") compositions, which are, prior to curing, in the form of liquids and after curing in the form of an elastomeric product are well known in silicone industry. LSRs find many uses. LSRs have been attractively used in textile printing applications due to the soft hand feel and washing durability of the resulting treated textiles.

However, currently available LSRs used to treat textiles tend to provide textiles with a tacky and dissatisfactory film appearance. In some instances, it is desirable to obtain either a matt or glossy appearance. Some textiles like cellulosic fibers also suffer from fibrillation which tend to give coated textiles an undesirable worn out appearance.

The present invention provides a liquid silicone rubber composition, which comprises:
(i) a liquid silicone rubber base,
(ii) from 3 to 8 wt % of the composition of a hydrophobic silica aerogel different from the reinforcing filler of the of the liquid silicone rubber base,
(iii) from 3 to 8 wt % of the composition of an elastomeric powder, and
(iv) a volatile solvent, and
wherein the wt ratio of hydrophobic silica aerogel (ii): elastomeric powder (iii) is from 0.8:1 to 2:1.

The present invention further relates to a method to prepare said composition, and a method to coat or print on textiles using said composition.

Finally disclosed is the use of a combination of a hydrophobic silica aerogel and an elastomeric powder in a liquid silicone rubber (LSR) composition. In some instances, the liquid silicone rubber (LSR) composition is useful for textile coating.

DETAILED DESCRIPTION

The present compositions allow for articles or coatings having a matt appearance while having satisfying sensory feel/haptic, together with low-tackiness, and elongation. Additionally, contrary to comparative LSR coatings, the present coatings allows for coating on cellulosic fibres while avoiding fibrillation.

In the scope of the present invention, fibrillation is understood as fibre deterioration which is typically assessed visually and providing for an undesired worn out visual effect also known as orange peel effect.

(i) Liquid silicone rubber base (curable silicone rubber formulation)

For the avoidance of doubt and henceforth in the present disclosure the term liquid silicone rubber base (i) is used to describe a curable silicone rubber formulation which is mixed with components (ii), (iii) and (iv) above to make the liquid silicone rubber composition described herein. Different compositions exist for liquid silicone rubber bases as defined above. Typically, the liquid silicone rubber base useful in the present invention is an addition curable liquid silicone rubber base as defined above comprising at least one liquid alkenyl-containing polydiorganosiloxane (A), at least one organohydrogenpolysiloxane (B), at least one reinforcing filler (C), at least one hydrosilylation catalyst (D), and, optionally, additional ingredients.

A) Liquid alkenyl-containing polydiorganosiloxane

Ingredient (A) is a liquid polydiorganosiloxane containing at least two silicon-bonded alkenyl radicals in each molecule. Suitable alkenyl radicals in ingredient (A) typically contain from 2 to 10 carbon atoms, preferred example, vinyl, isopropenyl, allyl, and 5-hexenyl. Ingredient (A) typically additionally comprises silicon-bonded organic groups other than alkenyl radicals. Such silicon-bonded organic groups are typically selected from monovalent saturated hydrocarbon radicals, which typically contain from 1 to 10 carbon atoms, and monovalent aromatic hydrocarbon radicals, which typically contain from 6 to 12 carbon atoms, which are unsubstituted or substituted with the groups that do not interfere with curing of this inventive composition, such as halogen atoms. Preferred species of the silicon-bonded organic groups are, for example, alkyl groups such as methyl, ethyl, and propyl; halogenated alkyl groups such as 3,3,3-trifluoropropyl; and aryl groups such as phenyl.

The molecular structure of ingredient (A) is typically linear, however, there can be some branching due to the presence of trivalent siloxane units within the molecule. To achieve a useful level of physical properties in the elastomer prepared by curing the LSR composition of the present invention, the molecular weight of ingredient (A) should be sufficient so that it achieves a viscosity of at least 0.1 Pa·s at 25° C. relying on the cup/spindle method of ASTM D 1084 Method B, using an appropriate spindle for the viscosity range. The upper limit for the molecular weight of ingredient (A) is not specifically restricted and is typically limited only by the processability of the LSR composition of the present invention.

Examples of ingredient (A) are polydiorganosiloxanes containing alkenyl radicals at the two terminals and are represented by the general formula (I):

$$R'R''R'''SiO-(R''R'''SiO)_m-SiOR'''R''R' \qquad (I)$$

In formula (I), each R' is an alkenyl radical, which typically contains from 2 to 10 carbon atoms, such as vinyl, allyl, and 5-hexenyl.

R'' does not contain ethylenic unsaturation, Each R'' may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R'' may be unsubstituted or substituted with one or more groups that do not interfere with curing of this inventive composition, such as halogen atoms. R''' is R' or R''. m represents a degree of polymerization suitable for ingredient (A) to have a viscosity of at least 0.1 Pa·s at 25° C., typically from 0.1 to 300 Pa·s at 25° C. relying on the cup/spindle method of ASTM D 1084 Method B, using an appropriate spindle for the viscosity range.

Typically, all R'' and R''' groups contained in a compound in accordance with formula (I) are methyl groups. Alternatively at least one R″ and/or R‴ group in a compound in accordance with formula (I) is methyl and the others are phenyl or 3,3,3-trifluoropropyl. This preference is based on the availability of the reactants typically used to prepare the polydiorganosiloxanes (ingredient (A)) and the desired properties for the cured elastomer prepared from compositions comprising such polydiorganosiloxanes.

Typical examples of ingredient (A) containing ethylenically unsaturated hydrocarbon radicals only in terminal groups include, but are not limited to, dimethylvinylsiloxy-terminated polydimethylsiloxane, dimethylvinylsiloxy-terminated polymethyl-3,3,3-trifluoropropylslioxane, dimethylvinylsiloxy-terminated dimethylsiloxane-3,3,3-trifluoropropylmethylsiloxne copolymer, and dimethylvinylsiloxy-terminated dimethylsiloxane/methylphenylsiloxane copolymer.

Generally, ingredient (A) has a viscosity of at least 0.1 Pa·s at 25° C., typically from 0.1 to 300 Pa·s. more typically 0.1 to 100 Pa·s at 25° C. relying on the cup/spindle method of ASTM D 1084 Method B, using an appropriate spindle for the viscosity range.

(B) Organohydrogenpolysiloxane

Ingredient (B) is an organohydrogenpolysiloxane, which operates as a cross-linker for curing ingredient (A), by the addition reaction of the silicon-bonded hydrogen atoms in ingredient (B) with the alkenyl groups in ingredient (A) under the catalytic activity of ingredient (E) to be mentioned below. Ingredient (B) normally contains 3 or more silicon-bonded hydrogen atoms so that the hydrogen atoms of this ingredient can sufficiently react with the alkenyl radicals of ingredient (A) to form a network structure therewith and thereby cure the composition.

The molecular configuration of ingredient (B) is not specifically restricted, and it can be straight chain, branch-containing straight chain, or cyclic. While the molecular weight of this ingredient is not specifically restricted, the viscosity is typically from 0.001 to 50 Pa·s at 25° C. relying on the cup/spindle method of ASTM D 1084 Method B, using an appropriate spindle for the viscosity range in order to obtain a good miscibility with ingredient (A).

Ingredient (B) is typically added in an amount such that the molar ratio of the total number of the silicon-bonded hydrogen atoms in ingredient (B) to the total number of all alkenyl radicals in ingredient (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of ingredient (B) include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units, and
(vi) copolymers composed of $(CH_3)_3SiO_{1/2}$ units, $(CH_3)_2HSiO_{1/2}$ units, and $SiO_{4/2}$ units.

(C) Reinforcing filler

To achieve high level of physical properties that characterize some types of cured elastomer that can be prepared using the LSR composition of the present invention, it may be desirable to include a reinforcing filler such as finely divided silica. Silica and other reinforcing fillers are often treated with one or more known filler treating agents to prevent a phenomenon referred to as "creping" or "crepe hardening" during processing of the curable composition.

Finely divided forms of silica are preferred reinforcing fillers. Colloidal silicas are particularly preferred because of their relatively high surface area, which is typically at least 50 m²/g. Fillers having surface areas of from 100 to 400 m²/g measured in accordance with the BET method, alternatively of from 100 to 300 m²/g (using the BET method), are typically used. Colloidal silicas can be provided in the form of precipitated or fumed silica. Both types of silica are commercially available.

The amount of finely divided silica or other reinforcing filler used in the LSR composition of the present invention is at least in part determined by the physical properties desired in the cured elastomer. The LSR composition of the present invention typically comprises from 5 to 50 parts, typically from 10 to 30 parts by weight of a reinforcing filler (e.g., silica), based on the weight of the polydiorganosiloxane (ingredient (A)), typically 5 to 50 parts and more typically 10 to 30 parts for every 100 parts of ingredient A.

When the filler is naturally hydrophilic (e.g. untreated silica fillers), it is typically treated with a treating agent. This may be prior to introduction in the composition or in situ (i.e. in the presence of at least a portion of the other ingredients of the LSR composition of the present invention by blending these ingredients together until the filler is completely treated and uniformly dispersed to for a homogeneous material). Typically, untreated filler is treated in situ with a treating agent in the presence of ingredient (A).

Typically the filler is surface treated using for example with a fatty acid or a fatty acid ester such as a stearate, or with organosilanes, polydiorganosiloxanes, or organosilazanes hexaalkyl disilazane or short chain siloxane diols to render the filler(s) hydrophobic and therefore easier to handle and obtain a homogeneous mixture with the other ingredients. The surface treatment of the fillers makes the fillers easily wetted by the silicone polymer. These surface modified fillers do not clump, and can be homogeneously incorporated into the silicone polymer. This results in improved room temperature mechanical properties of the uncured compositions.

Typically the filler treating agent can be any low molecular weight organosilicon compounds disclosed in the art applicable to prevent creping of organosiloxane compositions during processing.

The treating agents are exemplified but not limited to liquid hydroxyl-terminated polydiorganosiloxane containing an average from 2 to 20 repeating units of diorganosiloxane in each molecule, hexaorganodisiloxane, hexaorganodisilazane, and the like. The hexaorganodisilazane intends to hydrolyze under conditions used to treat the filler to form the organosilicon compounds with hydroxyl groups. Typically, at least a portion of the silicon-bonded hydrocarbon radicals present in the treating agent are identical to a majority of the hydrocarbon radicals present in ingredients (A) and (B). A small amount of water can be added together with the silica treating agent(s) as processing aid.

It is believed that the treating agents function by reacting with silicon-bonded hydroxyl groups present on the surface of the silica or other filler particles to reduce interaction between these particles.

The filler may be treated with the treating agent prior to formulating, and the treated filler is commercially available.

(D) Hydrosilylation catalyst

Curing of the LSR composition of the present invention is catalyzed by ingredient (D), which is a hydrosilylation catalyst that is one of the platinum metals (platinum, ruthenium, osmium, rhodium, iridium and palladium), or a compound of one or more of such metals. Platinum and platinum compounds are preferred due to the high activity level of these catalysts in hydrosilylation reaction.

Example of preferred curing catalysts include but are not limited to platinum black, platinum on various solid supports, chloroplatinic acids, alcohol solutions of chloroplatinic acid, and complexes of chloroplatinic acid with liquid ethylenically unsaturated compounds such as olefins and organosiloxanes containing ethylenically unsaturated silicon-bonded hydrocarbon radicals. Complexes of chloroplatinic acid with organosiloxanes containing ethylenically unsaturated hydrocarbon radicals are described in U.S. Pat. No. 3,419,593.

The concentration of ingredient (D) in the LSR composition of the present invention is equivalent to a platinum-group metal concentration from 0.1 to 500 parts by weight of platinum-group metal, per million parts (ppm), based on the combined weight of ingredients (A) and (B).

Mixtures of the aforementioned ingredients (A), (B), and (D) may begin to cure at ambient temperature.

To obtain a longer working time or pot life of the LSR composition of the present invention, a suitable inhibitor can be used in order to retard or suppress the activity of the catalyst. For example, the alkenyl-substituted siloxanes as described in U.S. Pat. No. 3,989,887 may be used. Cyclic methylvinylsiloxanes are preferred.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Inhibitor concentrations as low as 1 mole of inhibitor per mole of the metal will in some instances impart satisfactory storage stability and cure rate. In other instances inhibitor concentrations of up to 500 moles of inhibitor per mole of the metal are required. The optimum concentration for a given inhibitor in a given composition is readily determined by routine experimentation.

Additional optional ingredients

Additional optional ingredients may be present in the liquid silicone rubber base composition depending on the intended use of the silicone rubber composition. Examples of such optional ingredients include electrical conductive fillers, thermally conductive fillers, non-conductive filler, pot life extenders, flame retardants, lubricants, non-reinforcing fillers, pigments coloring agents, adhesion promoters, chain extenders, silicone polyethers, and mixtures thereof.

Further examples of additives include mold release agents, diluents, solvents, UV light stabilizers, bactericides, wetting agent, heat stabilizer, compression set additive, plasticizer, and mixtures thereof.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, aluminium oxide), graphite, diamond, and mixtures or derivatives thereof.

Examples of non-conductive fillers include quartz powder, diatomaceous earth, talc, clay, alumina, mica, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The liquid curable silicone rubber composition may thus be free of pot life extender.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity<150 mPa·s at 25° C. relying on the cup/spindle method of ASTM D 1084 Method B, using an appropriate spindle for the viscosity range. When present such silicone fluid may be present in the liquid curable silicone rubber composition in an amount ranging of from 0.1 to 5% by weight (% wt), based on the total weight of the composition.

Examples of non-reinforcing fillers include quartz, alumina, mica, calcium carbonate.

Examples of pigments include carbon black, titanium dioxide, chromium oxide, bismuth vanadium oxide, iron oxides and mixtures thereof.

Examples of coloring agents for textile coating include pigments, vat dyes, reactive dyes, acid dyes, chrome dyes, disperse dyes, cationic dyes and mixtures thereof.

Examples of adhesion promoters include alkoxysilane containing methacrylic groups or acrylic groups such as methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane; zirconium chelate compound such as zirconium (IV) tetraacetyl acetonate, zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), diisopropoxy bis (2,2,6,6-tetramethyl-heptanethionate) zirconium, or similar zirconium complexes having β-diketones (including alkyl-substituted and fluoro-substituted forms thereof); epoxy-containing alkoxysilanes such as 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Examples of chain extenders include disiloxane or a low molecular weight polyorganosiloxane containing two silicon-bonded hydrogen atoms at the terminal positions. The chain extender typically reacts with the alkenyl radicals of ingredient (A), thereby linking two or more molecules of ingredient (A) together and increasing its effective molecular weight and the distance between potential cross-linking sites.

A disiloxane is typically represented by the general formula $(HR^a{}_2Si)_2O$. When the chain extender is a polyorganosiloxane, it has terminal units of the general formula $HR^a{}_2SiO_{1/2}$ and non-terminal units of the formula $R^b{}_2SiO$. In these formulae, $R^a$ and $R^b$ individually represent unsubstituted or substituted monovalent hydrocarbon radicals that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

A chain extender may be added in an amount from 1 to 10 parts by weight, based on the weight of ingredient (A), typically 1 to 10 parts per 100 parts of ingredient A.

Chain extenders suitable for use in the present compositions have viscosities from about 0.001 to 1 Pa·s at 25° C., typically from about 0.001 to 0.1 Pa·s at 25° C. relying on the cup/spindle method of ASTM D 1084 Method B, using an appropriate spindle for the viscosity range.

In a preferred embodiment of the invention, the pigments and dyes are used in form of pigment masterbatch composed of them dispersed in the polydiorganosiloxane with a low viscosity (ingredient (A)) at the ratio of 25:75 to 70:30.

Examples of silicone polyethers include polydiorganosiloxane-polyether copolymer, represented by the general formula (II):

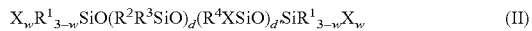

(where X is —$R^5$—$(OC_2H_4)_y(OA)_zE$)
wherein $R^1$, $R^2$, $R^3$, and $R^4$ are independently selected from monovalent saturated hydrocarbon radicals, which typically contain from 1 to 10 carbon atoms, and monovalent aromatic hydrocarbon radicals, which typically contain from 6 to 12 carbon atoms; E is identical or different and selected from hydroxy, alkoxy typically containing from 1 to 6 carbon atoms, and carboxyl; A is an alkylene typically containing from 1 to 6 carbon atoms; $R^5$ denotes an alkylene radical typically containing 2 to 6 carbon atoms; w is an integer of 0, 1, or 2, and must be 1 or 2 when d' is zero; d is an integer of 0 to 200, and d' is an integer of 0 to 15, where d and d' are present in amounts relative to each other such that ingredient (D) contains from 5 to 50 percent by mole of polyether per molecule; y and z are independently integer of 0 to 30, the sum of y and z being in the range from 2 to 50.

$R^1$, $R^2$, $R^3$, and $R^4$ are typically methyl. $R^5$ is typically propylene or iso-butylene. E is typically hydroxyl, methoxy, or acetoxy. A is typically propylene, iso-propylene, or butylene.

The polydiorganosiloxane-polyether copolymer of general formula (II) may have from 5 to 50 percent by mole of polyether units.

Such a polydiorganosiloxane-polyether copolymer, represented by the general formula (II), may be present when the liquid silicone rubber base as defined above is intended for textile coating, or textile printing, in an amount from 0.05 to 4.5 parts by weight, for every 100 parts by weight of the combined weight of ingredients (A), (B), and (C).

The liquid silicone rubber base as defined above is present in the liquid silicone composition in an amount of from 55 to 90% wt, alternatively of from 60 to 90% wt.

(ii) Hydrophobic silica aerogel different from the reinforcing filler

The hydrophobic silica aerogel refers to hydrophobic silica material obtained from a process allowing for a hydrophobic surface coverage, for a specific surface area and for specific porosity.

The hydrophobic silica aerogel is characterized by a surface area ranging of from 500 to 1500 $m^2/g$, alternatively of from 500 to 1200 $m^2/g$, alternatively of from 600 to 800 $m^2/g$, in each case determined via the BET method.

The quality of the trialkylsilylated hydrophobic coverage of the silica surface allows for a permanent hydrophobicity and stability against hydrolysis and attack by water over a wide range of pH. Water absorption of such hydrophobic silica aerogel is less than 10 g of water per 100 g of particles.

The hydrophobic silica aerogel may further be characterized by its porosity above 80%, alternatively above 90%. In the present instance all values of porosity were obtained from suppliers product data sheets.

The hydrophobic silica aerogel may have an average particle size ranging from 5 to 1000 μm, alternatively of form 5 to 100 μm, alternatively of from 5 to 25 μm as measured by means of laser light scattering (e.g., according to ASTM D4464-15).

At least one method for producing hydrophobic silica aerogel is known, wherein a) a lyogel is provided; b) the lyogel provided in step (a) is washed with an organic solvent; c) the surface of the gel obtained in step (b) is silylated; and d) the silylated surface gel obtained in step (c) is dried. The method is characterized in that a disiloxane of the formula (I) $R_3Si$—O—$SiR_3$ is used as silylating agent in step (c), wherein the radicals R mean individually, being the same or different, either a hydrogen atom or a non-reactive organic linear, branched, cyclic, saturated or unsaturated, aromatic or heteroaromatic radical.

An example of hydrophobic silica aerogel is a trimethyl silylated aerogel.

The hydrophobic silica aerogel is distinct from the reinforcing filler (C) discussed above on at least the parameter of surface area, where the reinforcing filler (C) has a surface area of from 100 to 400 $m^2/g$ using the BET method, while the hydrophobic silica aerogel is characterized by a surface area ranging of from 500 to 1200 $m^2/g$ using the BET method.

The hydrophobic silica aerogel is present in the liquid silicone rubber composition in a an amount of from 3 to 8% wt, alternatively of from 3 to 7% wt, alternatively of from 3 to 6% wt, alternatively of from 3 to 5% wt.

(iii) Elastomeric powder

The elastomeric powder is a crosslinked silicone elastomer in the form of a powder.

The elastomeric powder may be obtained by addition reaction-cure of a composition comprising (A) an organopolysiloxane which contains at least two intramolecular low-molecular-weight alkenyl groups, (B) an organopolysiloxane which contains at least two intramolecular silicon bonded hydrogen atoms, and (C) a platinum compound catalyst.

The elastomeric powder may contain functional groups, such as epoxy functional groups, polyether functional groups, amino groups, depending on the functional groups present on the organopolysiloxane (A) which contains at least two intramolecular low-molecular-weight alkenyl groups, and on the organopolysiloxane (B) which contains at least two intramolecular silicon bonded hydrogen atoms.

The elastomeric powder may be provided in an admixture with silica particles, titanium dioxide particles, amino acids. Said admixed particles may be added to the elastomeric powder before, during or after the addition reaction cure providing for said elastomeric powder.

The elastomeric powder may have an average particle size ranging of from 0.1 to 3000 μm, alternatively of from 0.1 to 1000 μm, alternatively of from 0.5 to 300 μm, alternatively of from 0.5 to 100 μm, alternatively of from 0.5 to 60 μm. The average particle size of the elastomeric powder (cured silicone rubber particles) was determined by using a Model LA-500 laser diffraction type particle size distribution analyzer of Horiba Ltd. The median size, i.e., the particle size corresponding to 50% of the cumulative distribution, was used as the average particle size.

The elastomeric powder is present in the liquid silicone rubber composition in an amount of from 3 to 8% wt, alternatively of from 3 to 7% wt, alternatively of from 3 to 6% wt.

The weight ratio of hydrophobic silica aerogel (ii) to elastomeric powder (iii) is in a range of from of 0.80:1 to 2:1, alternatively from 0.80:1 to 1.5:1, alternatively from 0.8:1 to 1.2:1.

At least one volatile solvent (iv) may be used as processing aid to prepare the present liquid silicone rubber composition. Volatile solvents useful in the present invention include silicone based volatile solvents and hydrocarbon based volatile solvents, and mixtures thereof.

Examples of silicone based volatile solvents include silicone fluids having a viscosity at room temperature less than or equal to 6 cSt relying on the cup/spindle method of ASTM D 1084 Method B, using an appropriate spindle for the viscosity range and having from 2 to 7 silicon atoms, these silicones being optionally substituted with alkyl or alkoxy groups of 1 to 10 carbon atoms. Specific examples of such fluids include octamethyltetrasiloxane, decamethylcyclopentasiloxane, dodecamethylcyclohexasiloxane, heptamethyloctyltrisiloxane, hexamethyldisiloxane, decamethyltetrasiloxane, dodecamethylpentasiloxane, polydimethylsiloxane having a viscosity of from 0.5 to 5 mPa·s measured using the cup/spindle method of ASTM D 1084 Method B, using an appropriate spindle for the viscosity range, octyltrimethicone, hexyltrimethicone, disilxoane, trisiloxane, and mixtures thereof.

In the scope of the present invention, the term "hydrocarbon based" is understood to mean any oil predominantly containing carbon and hydrogen atoms, and optionally ester, ether, fluoro, carboxylic acid and/or alcohol groups.

Examples of hydrocarbon based volatile solvents include volatile hydrocarbon oils having from 8 to 16 carbon atoms and their mixtures and in particular branched C8 to C16 alkanes such as C8 to C16 isoalkanes (also known as isoparaffins), isododecane, isodecane, isohexadecane, C8 to C16 branched esters such as isohexyl or isodecyl neopentanoate and mixtures thereof.

Further examples of hydrocarbon based volatile solvents include toluene, pentane, benzene, hexane, 1,4-dioxane, diethylether, dichloromethane, acetone, (iso)propyl alcohol, ethanol, methanol and mixtures thereof.

The solvent is present in the liquid silicone rubber composition in an amount of from 5 to 40% wt; alternatively of from 5 to 30% wt; alternatively of from 10 to 30% wt.

The volatile solvent (iv) will be released from the liquid silicone rubber composition upon curing of said composition.

The present invention thus provides a liquid silicone rubber composition, which comprises:
(i) a liquid silicone rubber base as defined above in an amount of from 55 to 90% wt,
(ii) a hydrophobic silica aerogel different from the reinforcing filler of the of the liquid silicone rubber base, in an amount of from 3 to 8% wt,
(iii) an elastomeric powder, in an amount of from 3 to 8% wt,
(iv) a volatile solvent, in an amount of from 5 to 40% wt, based on the total liquid silicone rubber composition equalling 100% wt.

The weight ratio of hydrophobic silica aerogel (ii) to elastomeric powder (iii) is in a range of from of 0.80:1 to 2:1, alternatively from 0.80:1 to 1.5:1, alternatively from 0.8:1 to 1.2:1.

The composition of the present invention may be prepared by combining all of ingredients at ambient temperature. Any mixing techniques and devices described in the prior art can be used for this purpose. The particular device to be used will be determined by the viscosities of ingredients and the final curable coating composition. Suitable mixers include but are not limited to paddle type mixers and kneader type mixers. Cooling of ingredients during mixing may be desirable to avoid premature curing of the composition.

The order for mixing ingredients is not critical in this invention. Typically, the liquid silicone rubber base as defined above will be composed of at least one part, alternatively 2 parts. The hydrophobic silica aerogel may be combined with the volatile solvent as processing aid in a separate container, and combined with the liquid silicone rubber base as defined above, before, simultaneously or after the elastomeric powder is added to the liquid silicone rubber base. That is, the liquid silicone rubber base as defined above may be combined with either the hydrophobic silica aerogel or the elastomeric powder in sequence, or simultaneously.

In some instances, the preparation may be made in sequential steps, where the hydrophobic silica aerogel is provided in a first mixture with the volatile solvent in one separate container, and the liquid silicone rubber composition is provided, subsequently mixing both compositions and last adding the elastomeric powder.

The viscosity of the composition ranges of from 10 to 10,000 Pa·s, alternatively of from 10 to 5,000 Pa·s, alternatively from 100 to 2000 Pa·s relying on the cup/spindle method of ASTM D 1084 Method B, using an appropriate spindle for the viscosity range.

The present liquid silicone rubber composition may alternatively be further processed by injection moulding, encapsulation moulding, press moulding, dispenser moulding, extrusion moulding, transfer moulding, press vulcanization, centrifugal casting, calendering, bead application or blow moulding.

Curing of the liquid curable silicone rubber composition may be carried at as required by the type of liquid silicone rubber utilized. Typical curing temperatures may range of from 80 to 200° C., alternatively of from 100-170° C.

Curing can for example take place in a mold to form a moulded silicone article. The composition may for example be injection moulded to form an article, or the composition can be overmoulded by injection moulding around an article or over a substrate.

In one embodiment, the present invention relates to an article cured from the liquid curable silicone rubber composition. Such articles include those that may be used in producing sports products, diving masks, ventilator bellows, balloon catheters, rubber teats, pacifiers, thin-walled membranes, switch covers, spark-plug connectors, medical products and devices, electrical insulators, single-wire seals, plug connector seals, tubing and valves, automobile components such as connector seal and spark plug boots, electric and electronic parts such as rolls in a copying machine and packing in a microwave oven; as well as other products such as feeding bottle nipple and diving gears, in view of the high heat resistance, cold resistance, safety, electric insulation, weatherability, and the like.

The liquid curable silicone rubber composition may be cured into silicone elastomer articles, such as tubes, strips, solid cord or custom profiles according to the size specifications of the manufacturer.

The cured silicone elastomer obtained from curing the liquid curable silicone rubber composition of the present invention may provide for composite parts where mechanical or chemical bonding to a substrate occurs.

In one embodiment, the present invention relates to a composite part comprising a silicone elastomer cured from the liquid curable silicone rubber composition on a substrate.

The substrate may be rigid or flexible. Examples of substrates include plastic substrates, thermoplastic substrates, metal substrates, cellulose substrates and textile substrates.

Examples of plastic substrates and thermoplastic substrates (also organic resins) include acrylonitrile-butadiene-styrene, polyphenylene/styrene blends, polystyrenes, polycarbonate, polyurethane, styrene resin, polyethylene, polypropylene, acrylic, polyacrylamides, polyesters, polyethylene terephthalate, polybutylene terephthalate, polyphenylene oxide, polyphenylene sulfide, polysulfone, nylon, polyamide, polyimide, fluoropolymers, and liquid crystal resin, non-resin containing polyetherimides.

Examples of metal substrates include metal substrates selected from copper, alclad aluminum, anodized aluminum, galvanized steel, cold-rolled steel, cast aluminum, and cast magnesium.

Examples of cellulose substrates include paper, cardboard, wood.

Such composite parts include those constructions where any of a plastic substrate or thermoplastic substrate and a silicone elastomer are used as an integral component.

Examples of such composite parts can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. In medical applications composite parts may be used in devices such as masks, goggles, tubing and valves catheters, ostomy appliances, respiratory appliances, feeding appliances, contact lenses, hearing aids, orthotics, prosthesis, and the like. In consumer and industrial applications composite parts may be found in shower heads, bakery ware, spatulas, home appliances, shoes, goggles, sports and leisure articles, diving masks, face masks, pacifiers and other baby articles, feeding accessories, seals and surfaces of white good and other kitchen articles, and the like. Electronic applications may include mobile phone cover seal, mobile phone accessories, precision electronic equipment, electrical switches and switch covers, watches and wristbands, wearable electronic devices, and the like.

The liquid curable silicone rubber composition may be applied to the surface of the substrate by any suitable means such as rolling, spreading, spraying, and the like, and cured as required.

When the liquid curable silicone rubber composition is used for airbag coating, the composition may be applied by any coating technique, including roller application, curtain coating, spray coating, knife coating or calendering.

In particular instances the liquid silicone rubber composition is intended for textile coating or textile printing. In such instances, the liquid silicone rubber base is typically a silicone textile printing ink.

The present invention therefore also includes a method for coating a textile, comprising coating the textile with a liquid silicone rubber composition and curing the composition to form a coating, characterized in that the liquid silicone rubber composition comprises
(i) a liquid silicone rubber base,
(ii) from 3 to 8 wt % of the composition of a hydrophobic silica aerogel different from the reinforcing filler of the of the liquid silicone rubber base,
(iii) from 3 to 8 wt % of the composition of an elastomeric powder, and
(iv) a volatile solvent, and
wherein the wt ratio of hydrophobic silica aerogel (ii): elastomeric powder (iii) is from 0.8:1 to 2:1.

In the above composition the silicone rubber base comprises at least one liquid alkenyl-containing polydiorganosiloxane (A), at least one organohydrogenpolysiloxane (B), at least one reinforcing filler (C), at least one hydrosilylation catalyst (D), and, optionally, additional ingredients, in each case as described above.

Without wishing to be bound by analytical results, it is expected the volatile solvent initially used as a processing aid will be released out of the composition upon curing of the composition on the textile substrate.

Examples of textile substrates to be coated with the liquid silicone rubber composition of the present invention includes natural and/or synthetic fibers. The textile may be a woven or non-woven material based on the natural and/or synthetic fibers. The textile may be a substrate such as leather.

Examples of synthetic fibers include nylon (such as Nylon 6, Nylon 66, Nylon 46) or other polyamide fiber; polyester fiber (such as polyethylene-terephthalate, polybutylene-terephthalate); polyacrylonitrile fiber, aramid fiber, polyetherimide fiber, polysulfone based fiber, carbon fiber, rayon fiber, polyethylene fiber, or mixtures thereof.

Examples of natural fibers include cellulosic fibers such as cotton, linen, rayon, viscose, jute; wool; silk; leather.

The LSR composition of the present invention may be cured by heating at a temperature from 80 to 200° C., alternatively of from 100 to 170° C. Curing time may range of from 3 seconds to 10 minutes, alternatively of from 3 seconds to 5 minutes. To obtain textiles having even better properties, such as with less damage, it is desirable that the LSR composition of the present invention is cured for at least 3 seconds at the above-mentioned temperature, and repeat the heating after it is cooled to room temperature.

The coating on the textile may occur by any known techniques useful to coat textile. Examples of textile printing methods include direct-printing, and heat transfer methods. Examples of direct-printing methods include block printing, roller printing, screen printing, blotch printing, airbrush painting, electrostatic printing, digital printing.

Direct screen printing is a particularly suitable known technique or process for creating or imprinting images to various substrates. Substrates may include for example textiles and fabrics such as clothing, typically t-shirts and the like.

An example of a direct printing process for providing a silicone ink base composition onto a textile substrate or other substrate comprises at least the steps of:
(i) providing a composition as defined herein;
(ii) direct printing the composition of step (i) onto the textile substrate or other substrate to conjoin the composition and the substrate; and
(iii) curing the composition forming a textile garment or article including the cured elastomeric direct printing composition.

An example of a direct printing process is a direct screen printing process, which may be a direct automatic screen printing process.

An example of heat-transfer printing process for transferring an image from one or more coats in a laminated heat-transfer product to a substrate alternatively a textile substrate comprises at least the steps of:
(i) providing a composition as defined herein;
(ii) combining the composition of step (i) with the substrate;
(iii) transferring the image from the one or more coats of the composition onto the substrate.

Normally, the fabric coating layer of the present liquid silicone rubber composition comprises a single layer. If necessary, however, an arbitrary number of layers can be formed on the fabric. Such additional layers are applied either for improving tactile sensation, for improving wear-resistant properties of the material, or for improving strength of the coated product. The [additional] coating layer may be exemplified by a plastic film, a woven fabric, non-woven fabric, or a layer from any other elastic coating material.

The invention provides for a textile coated with a coating obtained from curing the present liquid silicone rubber composition on said textile.

Also provided is the use of the present liquid silicone rubber composition for coating a textile.

In another embodiment, the use of the present liquid silicone rubber composition to screen print a coating onto a textile material is provided.

The use of a combination of hydrophobic silica aerogel (ii) and elastomeric powder (iii) in a liquid silicone rubber composition for coating a textile is disclosed. In some instances, the ratio of hydrophobic silica aerogel (ii) to elastomeric powder (iii) in the liquid silicone rubber composition is ranging from 0.8:1 to 2:1.

A method to impart mattifying effect to a silicone elastomer article or composite part is provided, wherein the article or composite part is obtained from curing a liquid silicone rubber composition comprising a combination of hydrophobic silica aerogel (ii) and elastomeric powder (iii).

EXAMPLES

Gloss test method: the coating composition provided in the present invention and the comparative compositions were applied on a piece of textile fabric, and left to cure, providing for a coating of 0.05 mm thickness (typically 3 layers of composition applied). In each instance three different types of fabric were used as alternative substrates for the sake of comparison, namely cotton, lycra and polyester, unless otherwise indicated the gloss values were the same irrespective of the substrate used. The resulting coating was measured for gloss at an angle of 60°, using a BYK micro-TRI-Gloss glossmeter.

Gloss of commercial available materials is currently 0.8 (at 60° angle).

Hand feel evaluation is run in comparison with standard samples from current commercial coatings, with 10 panelists. Satisfactory handfeel is considered when the 10 panelists confirm the improved feel for 1 sample over the comparative sample.

Discolouration was assessed by visual inspection.

The liquid silicone rubber base as disclosed in Table 1 was used in the following working examples. All viscosities were measured at 25° C. relying on the cup/spindle method of ASTM D 1084 Method B, using an appropriate spindle for the viscosity range unless otherwise indicated.

TABLE I

| | Liquid silicone rubber base 1 |
|---|---|
| Alkenyl-containing polydiorganosiloxane | mixture of alkenyl Vinyl-terminated polydimethylsiloxane having the viscosity of 55 Pa · s at 25° C. and Vinyl-terminated polydimethylsiloxane having the viscosity of 2 Pa · s at 25° C. |
| Organohydrogen polysiloxane | Mixture of Trimethylsiloxy-terminated polydimethyl-methylhydrogensiloxane containing 0.12% by weight of hydrogen atom bonded to silicon and the viscosity of 0.005 Pa · s at 25° C. and Hydrogendimethylsiloxy-terminated polydimethylsiloxane having the viscosity of 0.011 Pa · s at 25° C. |
| Inhibitor | Mixture of Methylvinyl cyclosiloxane (MeViSiO)$_n$ (n < 6) and 1-Ethynyl-1-cyclohexanol |
| Reinforcing filler | Hydrophobic treated fumed silica having the surface area of 225 m$^2$/g (BET Method) |
| Hydrosilylation catalyst | A catalyst, which was a solution composed of 0.2 percent by weight of platinum-siloxane complex prepared from platinum dichloride and 1,3-divinyltetramethyldisiloxane according to method described in U.S. Pat. No. 5,175,325, and 98 percent by weight of vinyldimethylsiloxy-terminated polydimethylsiloxane having the viscosity of 0.19 Pa · s at 25° C. and 1.8 percent by weight of 1,3-divinyltetramethyldisiloxane, to have platinum content of 1000 ppm. |

Examples 1 to 7

Each example and comparative example was prepared by mixing the ingredients and applying the resulting composition onto a cotton, a lycra and a polyester fabric substrate surface. Samples were cured for a period of 2 minutes at a temperature of 140° C. and the resulting cured elastomeric product was analysed for gloss, hand feel and discoloration. Examples 1 to 7, disclosed in Table 2, indicate the matt evolution upon the combination of the aerogel and elastomeric powder, when used in conjunction. Additionally, the Examples having the lower gloss maintain a good feel, as desired for the function.

TABLE 2

| Parts by weight | Example 1 | Example 2 | Example 3 | Example 4 | Example 5 | Example 6 | Example 7 |
|---|---|---|---|---|---|---|---|
| Liquid silicone rubber base 1 | 94 | 94 | 94 | 94 | 94 | 94 | 94 |
| Black pigment | 10 | 10 | 10 | 10 | 10 | 10 | 10 |
| Hydrophobic silica aerogel | 0.5 | 1 | 2 | 3 | 3.5 | 4 | 5 |
| Elastomeric powder | 1 | 2 | 3 | 4 | 4.5 | 5 | 6 |
| Solvent (silicone based) | 20 | 20 | 20 | 20 | 20 | 20 | 40 |
| GLOSS (60 degree) | 0.9 | 0.9 | 0.7 | 0.6 | 0.5 | 0.4 | 0.3 |
| Feel | Rubbery feel | Rough | Rough | Good | Good | Soft | Soft |
| Discolouration Observed? | No | No | No | No | No | No | No |

It was found that Examples 6 and 7 successfully met all requirements in that no discolouration was noted, they had a soft feel and a gloss of <0.5. Of these example 6 was preferred given it had a lower viscosity. Indeed additional solvent (iv) was added into composition of example 7 than might have originally been intended but even then the viscosity was deemed too high to be used as a practical ink. Examples 4 and 5 also gave pretty good results but unfortunately their gloss values were slightly higher than preferred.

Comparative Examples 1 to 5

Comparative Examples 1 to 5 are disclosed in Table 3.
Comparative Example 1 represents the liquid silicone rubber composition free of hydrophobic silica aerogel and elastomeric powder. Gloss is not satisfying with a value of 1.

Comparative Examples 2 to 4 provide for comparison with additional hydrophobic filler having a surface area of 200-240 mm²/g (BET method), also free of hydrophobic silica aerogel and elastomeric powder. Gloss is reduced with increasing amount of hydrophobic silica, but color discoloration was noticed, which is not acceptable in the field of textile coating. Furthermore, the viscosity of comparative example 4 was too high for use in a printing ink application as well as showing discolouration.

Comparative Example 5 features a known mattifying ingredient Expancel® DET 40, from Akzo Nobel, that is, dry microspheres composed of a thermoplastic shell encapsulating a gas, which expand upon heating. Although gloss is reduced to a commercially acceptable level of 0.7, hand feel remains unsatisfactory. Additionally, the composition is not easy to mix because of very low bulk density.

TABLE 3

| Parts by weight | Comparative Example 1 | Comparative Example 2 | Comparative Example 3 | Comparative Example 4 | Comparative Example 5 |
|---|---|---|---|---|---|
| Liquid silicone rubber base 1 | 94 | 94 | 94 | 94 | 94 |
| Black pigment | 10 | 10 | 10 | 10 | 10 |
| Hydrophobic silica - non aerogel (surface area 200-240 m²/g) | 0 | 3 | 7 | 14 | 0 |
| Expancel® DET 40 | 0 | 0 | 0 | 0 | 0.5 |
| Solvent | 0 | 20 | 20 | 20 | 20 |
| GLOSS (60 degree) | 1 | 0.9 | 0.8 | 0.4 | 0.7 |
| Feel | Rubbery | Rough | Good | Good | Rubbery |
| Discoloration Observed? | | Yes | Yes | Yes | |

Example 8 and Comparative Example 6

Example 8 and Comparative Example 6, disclosed in Table 4, are based on an alternative liquid silicone rubber composition 2 approved for textile coating.

Example 8 has a lower gloss at 0.4, taking advantage of the combined presence of the hydrophobic silica aerogel and elastomeric powder, which both are absent of Comparative Example 6. However, it was found that upon cure the elastomeric product of Example 8 was not sufficiently adhesive to the respective substrates to which it was applied. Liquid silicone rubber base 2 was a commercial curable LSR from Dow Silicones Corporation, Dowsil™ LCF 9800 Textile Printing Ink.

TABLE 4

| Parts by weight | Comparative Example 6 | Example 8 |
| --- | --- | --- |
| Liquid silicone rubber base 2 | 94 | 94 |
| Black pigment | 10 | 10 |
| Hydrophobic silica aerogel | 0 | 3 |
| Elastomeric powder | 0 | 4 |
| Solvent | 0 | 10 |
| GLOSS (60 degree) | 0.8 | 0.4 |
| Feel | Rubbery | Good |

Comparative Examples 7-8

Comparative Examples 7 and 8, disclosed in Table 5, illustrate the requirement of the combined presence of the hydrophobic silica aerogel and elastomeric powder to achieve a satisfactory level of gloss. When the hydrophobic silica aerogel is used alone, gloss is only reduced to a value of 0.7. When the elastomeric powder is used alone, gloss in increased to 1.7.

It is therefore surprising that adding the elastomeric powder to the hydrophobic silica aerogel would further decrease gloss, rather than cancelling the mattifying effect of the hydrophobic silica aerogel.

TABLE 5

| Parts by weight | Comparative Example 7 | Comparative Example 8 |
| --- | --- | --- |
| Liquid silicone rubber base | 94 | 94 |
| Black pigment | 10 | 10 |
| Hydrophobic silica aerogel | 4.5 | 0 |
| Elastomeric powder | 0 | 5.6 |
| Solvent | 22.5 | 22.5 |
| GLOSS (60 degree) | 0.6 | 1.7 |
| Feel | Rough | Rubbery |

Given the excellent results of Example 6 in Table 2 the physical properties of this composition were further analysed to indicate its suitability for use as a printing ink. Results showed that this was a suitable material and had sufficiently good physical properties for use as a printing ink.

TABLE 6

| Post Cure Physical Properties | | |
| --- | --- | --- |
| Property | Test Method | Result |
| Durometer hardness (Shore A) | ASTM D2240 | 40 |
| Tensile Strength (MPa) | ASTM D412 | 4.2 |
| Elongation at break (%) | ASTM D412 | 400 |

These results indicate that the use of the aerogel and elastomeric powders in combination provided decreased gloss results of <0.5 but did not substantially negatively affect the standard physical properties of the cured elastomeric silicone rubber materials.

Likewise, it was seen that the gloss values were not affected by the substrate to which these materials had been applied, in that in each case the gloss values were noted to be 0.4 as can be seen in Table 7 below.

TABLE 7

| Gloss value on different Fabric Substrates | |
| --- | --- |
| Fabric type | Gloss (60°) |
| Lycra | 0.4 |
| Polyester cotton blend | 0.4 |
| Cotton | 0.4 |

Wash Fastness

As a measure of the adhesion of the elastomeric product s on the different fabric substrates above samples of fabrics to which the elastomeric product resulting from the cured elastomer made from the composition of Example 6 above were washed and analysed in accordance with AATCC Test Method 61-2003 Test No. 1A. Samples were washed 25 times and subsequent to each wash the samples were assessed for the loss of elastomer from the fabric substrate (wash off) during the wash. Table 8 below shows that no wash off was observed.

TABLE 8

| Wash Fastness | |
| --- | --- |
| Fabric type | Wash Fastness (25 washes) |
| Lycra | No wash off Observed |
| Polyester cotton blend | No wash off Observed |
| Cotton | No wash off Observed |

A further advantage of the coating made from the ink made from the formulation of example 6 above is that there were no visible signs of fibre deterioration (fibrillation) after cure, i.e. the apparent worn out appearance was not observed on the substrates utilised.

The invention claimed is:

1. A liquid silicone rubber composition comprising:
   (i) a liquid silicone rubber base comprising a reinforcing filler;
   (ii) a hydrophobic silica aerogel in an amount of from 3 to 8 weight percent (wt %) of the composition, where the hydrophobic silica aerogel is different from the reinforcing filler of the liquid silicone rubber base (i);
   (iii) an elastomeric powder in an amount of from 3 to 8 wt % of the composition; and
   (iv) a volatile solvent;
   wherein the weight ratio of the hydrophobic silica aerogel (ii) to the elastomeric powder (iii) is from 0.8:1 to 2:1.

2. The liquid silicone rubber composition according to claim 1, wherein the liquid silicone rubber base (i) comprises at least one liquid alkenyl-containing polydiorganosiloxane (A), at least one organohydrogenpolysiloxane (B), at least one reinforcing filler (C), and at least one hydrosilylation catalyst (D).

3. The liquid silicone rubber composition according to claim 1, wherein the hydrophobic silica aerogel (ii) has a surface area of from 500 to 1200 $m^2$/g using the BET method.

4. The liquid silicone rubber composition according to claim 1, wherein the hydrophobic silica aerogel (ii) has a particle size of from 5 to 1000 μm as measured by of laser light scattering.

5. The liquid silicone rubber composition according to claim 1, wherein the elastomeric powder (iii) has a particle size of from 0.1 to 1000 μm as measured by a laser diffraction type particle size distribution analyzer.

6. The liquid silicone rubber composition according to claim 1, wherein the weight ratio of the hydrophobic silica aerogel (ii) to the elastomeric powder (iii) is from 0.8:1 to 1.5:1.

7. The liquid silicone rubber composition according to claim 1, wherein the volatile solvent (iv) is selected from the group consisting of silicone based volatile solvents, hydrocarbon based volatile solvents, and mixtures thereof.

8. The liquid silicone rubber composition according to claim 1, wherein the liquid silicone rubber base (i) is a silicone textile printing ink.

9. A method for preparing the liquid silicone rubber composition according to claim 1, the method comprising mixing ingredients (i) to (iv) at ambient temperature.

10. A method for coating a textile, the method comprising:
coating the textile with a liquid silicone rubber composition; and
curing the composition to form a coating;
wherein the liquid silicone rubber composition comprises:
(i) a liquid silicone rubber base comprising a reinforcing filler;
(ii) a hydrophobic silica aerogel in an amount of from 3 to 8 weight percent (wt %) of the composition, where the hydrophobic silica aerogel is different from the reinforcing filler of the liquid silicone rubber base (i);
(iii) an elastomeric powder in an amount of from 3 to 8 wt % of the composition; and
(iv) a volatile solvent; and
wherein the weight ratio of the hydrophobic silica aerogel (ii) to the elastomeric powder (iii) is from 0.8:1 to 2:1.

11. The method according to claim 10, wherein the textile is selected from the group of leather or natural fibers and/or synthetic fibers.

12. The method according to claim 11, wherein the textile comprises natural fibers selected from the group consisting of cellulosic fibers, wool, and/or silk.

13. The method according to claim 10, wherein the composition is applied by screen printing.

14. A textile coated with the liquid silicone rubber composition in accordance with claim 1 or a cured coating thereof.

15. An article cured from the liquid silicone rubber composition in accordance with claim 1.

16. A composite part comprising a silicone elastomer cured from the liquid curable silicone rubber composition in accordance with claim 1 on a substrate.

17. A method to impart a mattifying effect to a silicone elastomer article or composite part, wherein the silicone elastomer article or composite part is obtained from curing a liquid silicone rubber composition comprising a combination of hydrophobic silica aerogel and elastomeric powder where the ratio of hydrophobic silica aerogel to elastomeric powder is from 0.8:1 to 2:1 to 2:1.

* * * * *